(12) United States Patent
Shimizu

(10) Patent No.: US 9,556,907 B2
(45) Date of Patent: Jan. 31, 2017

(54) RETAINER FOR TAPERED ROLLER BEARING

(71) Applicant: Yasuhiro Shimizu, Mie (JP)

(72) Inventor: Yasuhiro Shimizu, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/440,366

(22) PCT Filed: Oct. 24, 2013

(86) PCT No.: PCT/JP2013/078789
§ 371 (c)(1),
(2) Date: May 4, 2015

(87) PCT Pub. No.: WO2014/073383
PCT Pub. Date: May 15, 2014

(65) Prior Publication Data
US 2015/0300409 A1   Oct. 22, 2015

(30) Foreign Application Priority Data
Nov. 6, 2012 (JP) ................................. 2012-244289

(51) Int. Cl.
*F16C 33/46* (2006.01)
*F16C 19/36* (2006.01)
(Continued)

(52) U.S. Cl.
CPC ....... *F16C 33/4676* (2013.01); *B29C 45/0025* (2013.01); *F16C 19/364* (2013.01);
(Continued)

(58) Field of Classification Search
CPC .................. F16C 33/46–33/526; F16C 19/34; F16C 19/36; F16C 19/364; F16C 19/383; B29C 45/2628; B29C 45/0025; B29C 45/14778; B29C 70/72; B29L 2031/04; B29L 2031/045; Y10T 29/49691
See application file for complete search history.

(56) References Cited

U.S. PATENT DOCUMENTS 4,781,877 A * 11/1988 Rabe ................. B29C 45/14778
264/130
6,869,222 B1 * 3/2005 Okita .................... F04D 29/063
384/462
(Continued)

FOREIGN PATENT DOCUMENTS

DE   3424742 C1 * 11/1985 ............. B29C 33/10
DE   3718693 A1 * 12/1988 ......... B29C 45/0025
(Continued)

OTHER PUBLICATIONS

International Search Report issued Nov. 26, 2013 in International (PCT) Application No. PCT/JP2013/078789.
(Continued)

*Primary Examiner* — Alan B Waits
(74) *Attorney, Agent, or Firm* — Wenderoth, Lind & Ponack, L.L.P.

(57) ABSTRACT

Gates (G) are uniformly arranged in a circumferential direction only in a large annular section (2). The gates (G) are equal in number to a number of pockets (4). The gates (G) are arranged only at sites positioned on planes (Pa) passing circumferential centers of the respective pockets (4). Weld lines (W) are thus formed only in the vicinity of the planes (Pa) of a small annular section (1).

13 Claims, 9 Drawing Sheets

(51) Int. Cl.
*F16C 33/56* (2006.01)
*F16C 19/38* (2006.01)
*B29C 45/00* (2006.01)
*B29L 31/04* (2006.01)

(52) U.S. Cl.
CPC .......... *F16C 33/4635* (2013.01); *F16C 33/56* (2013.01); *B29C 2045/0027* (2013.01); *B29L 2031/045* (2013.01); *F16C 19/38* (2013.01); *F16C 2220/04* (2013.01)

(56) References Cited

U.S. PATENT DOCUMENTS 7,507,028 B2 * 3/2009 Markle ............... F16C 33/3875
 384/470
9,192,986 B2 * 11/2015 Shimazu ................... B22C 9/28

FOREIGN PATENT DOCUMENTS

| JP | 62-098029 | 5/1987 |
| JP | 11-022737 | 1/1999 |
| JP | 3396081 B2 * | 4/2003 |
| JP | 2003-287033 | 10/2003 |
| JP | 2006-070926 | 3/2006 |
| JP | 2008-232295 | 10/2008 |
| JP | 2012-107703 | 6/2012 |
| JP | 2012-179744 | 9/2012 |

OTHER PUBLICATIONS

Written Opinion of the International Searching Authority issued Nov. 26, 2013 in International (PCT) Application No. PCT/JP2013/078789 (with English translation).

* cited by examiner (c)

(b)

(a)

RETAINER FOR TAPERED ROLLER BEARING

TECHNICAL FIELD

The present invention relates to a retainer or a resin retainer for a tapered roller bearing which can retain tapered rollers between inner and outer raceways such that the tapered rollers are equidistantly spaced apart from each other.

BACKGROUND ART

The retainer for a tapered roller bearing is formed to a circular truncated cone shape as a whole, and includes a small annular section that faces the roller small end faces of tapered rollers, a large annular section that faces the roller large end faces of the tapered rollers, and retainer bar sections that partition the space between the small annular section and the large annular section into pockets. A resin retainer in which the small annular section, the large annular section, and all retainer bar sections (i.e., all pockets) are integrally injection molded is conventionally used.

To realize a simple mold structure from the standpoint of dimensional restriction that arises when obtaining a resin retainer for a tapered roller bearing and productivity, gates are arranged in a mold portion for molding the small annular section. Weld lines cannot be eliminated in the injection molding of the resin retainer. The weld lines are discontinuous portions of the material that are generated at the sites where the surfaces of injected resin portions merge at a low temperature. The mechanical strength is thus poor at such weld lines. Countermeasures have been taken to increase the sectional areas of the weld line generating sites as large as possible so that breakage does not occur from the regions of the weld lines (below-identified Japanese Patent Publication No. 2006-70926 A).

Problems to be Solved by the Invention

However, weld lines are formed in the large annular section in the resin retainer in which the gates are arranged in the small annular section as in Japanese Patent Publication No. 2006-70926 A. While a stress countermeasure is necessary in the large annular section compared to the small annular section in terms of the properties of the tapered roller bearing, a section cannot be expanded toward the inside diameter to enable ejection after the molding, and it is difficult for the section to be expanded toward the outside diameter and the axial direction to avoid contact with an outer race and an axle box in the large annular section. Thus, it is difficult for the resin retainer of Japanese Patent Publication No. 2006-70926 A to be applied to a tapered roller bearing used under high speed rotation and high vibration.

DISCLOSURE OF THE INVENTION

The object of the present invention, therefore, is to obtain a resin retainer for a tapered roller bearing excelling in adaptability to high speed rotation and high vibration.

Means for Solving the Problems

In order to achieve this object, the present invention provides a retainer for a tapered roller bearing comprising a small annular section, a large annular section, and retainer bar sections, wherein the small annular section, the large annular section and all of the retainer bar sections are integrally injection molded, wherein gates are arranged at sites of the large annular section uniformly spaced apart from each other in the circumferential direction and positioned on extensions of circumferential center lines of respective pockets, weld lines are generated only in the small annular section.

When gates are arranged at sites of the large annular section uniformly spaced apart from each other in the circumferential direction and positioned on the extensions of the circumferential center lines of the respective pockets, by setting the number of gates corresponding to the number of pockets (so as to be equal to the number of pockets if the number of pockets is an odd number, and equal to, or a factor of, the number of pockets if the number of pockets is an even number), the final merging sites of the injected resin can be limited to only those of the small annular section located in the vicinity of the extensions of the circumferential center lines of the pockets. Even if merging sites exist in the large annular section or the retainer bar sections, the distance from the gates can be shortened so as not to generate weld lines in these portions, by properly setting the number of the gates. Therefore, weld lines can be generated only in the small annular section. Since the large annular section does not include weld lines, the pulling strength with respect to the radial direction of the large annular section can be enhanced compared to a large annular section including weld lines. Furthermore, since the durability of the retainer bar sections for equally distributing the tapered rollers is also important under high speed rotation and high vibration, weld lines are preferably eliminated from the retainer bar sections too.

The small annular section is an area of high degree of freedom in dimension and shape in the resin retainer, and thus the bond strength at the weld lines can be increased and the weld line strength can be enhanced by expanding the sectional area of the small annular section at the weld line-generating sites or by enlarging the weld lines by properly designing the surface shape of the small annular section. As a result, a retainer for a tapered roller bearing excelling more in adaptability to high speed rotation and high speed vibration can be obtained. The expansion of the sectional area and the design of the surface shape include various specific means.

As an example of expanding the sectional area, the small annular section may include projections in which inside diameter dimensions are circumferentially intermittently reduced from the maximum inside diameter portion of the small annular section, and the respective weld lines may traverse the small annular section through the respective projections. In this example, the sectional area of the weld line-generating sites can be expanded by the projections.

As an example of the surface shape, groove-shaped thinned portions may be formed in a wave shape in side view on a side surface of the small annular section to extend the entire circumference thereof. In this example, the weld lines can be enlarged utilizing both groove walls of each of the thinned portions while reducing the variation in the cooling speed of the resin at the thinned portions.

As another example of expanding the sectional area, groove-shaped thinned portions may be circumferentially intermittently formed on the side surface of the small annular section, and each of the weld lines traverses the small annular section through a discontinuing portion provided between each circumferentially adjacent pair of the thinned portions. In this example, the thinned portion can be omitted and the sectional area can be expanded at the weld line-generating sites while reducing the variation in the cooling speed of the resin at the thinned portions.

As a combination example for expanding the sectional area and improvement in the surface shape, groove-shaped thinned portions may be circumferentially intermittently arranged on a side surface of the small annular section, circumferential ends of each of the thinned portions having a curved shape in side view; and a weld line lying along the curved shape may be formed in a discontinuing portion provided between each circumferentially adjacent pair of the thinned portions. In this example, the thinned portions can be omitted and the sectional area can be expanded at the weld line-generating sites, and furthermore, the weld lines can be elongated using the circumferential ends of the thinned portions.

As another combination example, groove-shaped thinned portions may be intermittently lined in the circumferential direction on a side surface of the small annular section; each discontinuing portion provided between the thinned portions adjacent to each other in the circumferential direction may have a step form in side view; and each of the weld lines may be generated along the step form. In this example, the thinned portions can be omitted and the sectional area can be expanded at the weld line-generating sites, and furthermore, the weld lines can be elongated using the groove walls and the circumferential ends of the thinned portion.

As still another combination example, groove-shaped thinned portions may be intermittently arranged in the circumferential direction on a side surface of the small annular section, the thinned portions being formed to a wedge shape tapered tin one of the opposite circumferential directions in side view; and each of the curved weld lines may be generated in each discontinuing portion provided between the thinned portions adjacent to each other in the circumferential direction. In this example, the thinned portions can be omitted and the sectional area can be expanded at the weld line-generating sites, and furthermore, the weld lines can be elongated using the groove walls and the circumferential ends of the thinned portions.

As still another example of expanding the sectional area, the inner circumferential surface of the small annular section may have a polygonal shape in side view; and each of the vertices of the polygonal shape and the circumferential center of each of the pockets may be shifted in the circumferential direction from each other. In this example, the sectional areas of the weld line-generating sites can be expanded compared to when the inner circumferential surface is a cylindrical inner circumferential surface having a uniform maximum inside diameter.

Even when the circumferential center of each of the projections and the circumferential center of each of the pockets are shifted in the circumferential direction from each other, the sectional area of the weld line-generating sites can be expanded.

Furthermore, even if the number of the pockets, and the number of the vertices or the number of the projections are different from each other, the sectional area of the weld line-generating sites can be expanded.

Effect of the Invention

As described above, by adopting the configurations described above, the present invention can obtain the resin retainer for the tapered roller bearing excelling in adaptability to high speed rotation and high vibration since the weld lines are eliminated from the large annular section and the retainer bar sections.

BEST MODE FOR CARRYING OUT THE INVENTION

Figure 1:
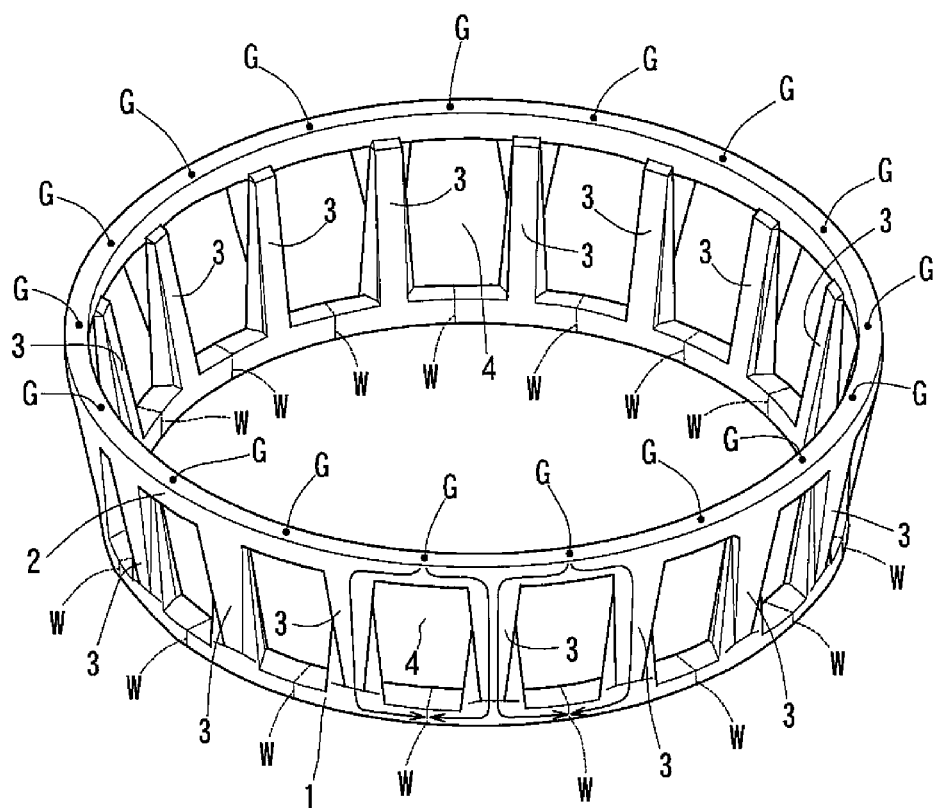
FIG. 1 is an overall perspective view of a resin retainer according to a first embodiment of the present invention.

A first embodiment of the present invention will be described in accordance with the accompanying drawings. A resin retainer for a tapered roller bearing (hereinafter simply referred to as "resin retainer") according to the first embodiment is obtained by integrally injection molding a small annular section 1, a large annular section 2, and all retainer bar sections 3, as shown in FIG. 1. Pockets 4 uniformly spaced apart from each other in a circumferential direction are formed simultaneously by such injection molding.

The pockets 4 are spaces in which respective tapered rollers 5 are received and in which the tapered rollers 5 are freely movable. Thus, for example, relief spaces for lubricating measure communicate with the pockets 4 but are not included in the pockets 4. The retainer bar sections 3 partition the space between the small annular section 1 and the large annular section 2 into the pockets 4. Therefore, the small annular section 1 includes integral portions deviated to one side (left side in the figure) in an axial direction from the retainer bar sections 3. The large annular section 2 includes integral portions deviated to the other side (right side in the figure) in the axial direction from the retainer bar sections 3. The axial direction is the direction in which a central axis of the retainer extends. The central axis of the retainer is the central axis of the circumference on which the pockets 4 are arranged at equal intervals, and is coaxial with the bearing axis. The outside diameter of the small annular section 1 is smaller than the outside diameter of the large annular section 2, and the inside diameter of the small annular section 1 is smaller than the inside diameter of the large annular section 2. A radial direction is a direction orthogonal to the central axis of the retainer. The circumferential direction is the circumferential direction about the central axis of the retainer. The tapered roller bearing using this resin retainer includes at least inner and outer raceways, with which the rolling contact surfaces of the tapered roller 5 make a rolling contact, and a flange that guides the roller large end faces of the tapered rollers 5. The raceways and the rib are to be appropriately arranged.

Figure 2:
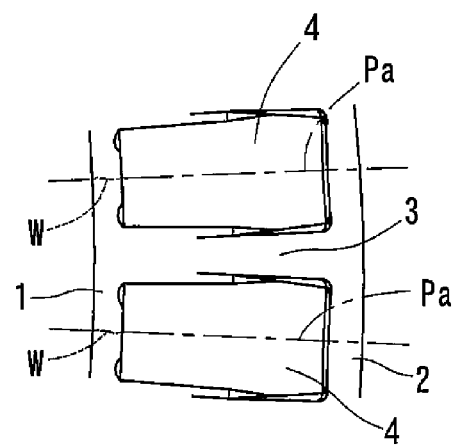
FIG. 2(a) is a partial sectional view in which a thinned portion of the first embodiment is cut along an axial plane.
FIG. 2(b) is a partial side view of a small annular section of the first embodiment seen from an axially outer side.
FIG. 2(c) is a partial plan view of the first embodiment seen from a radial direction.
Figure 2:
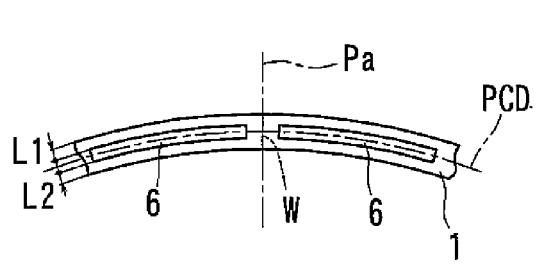
Figure 2:
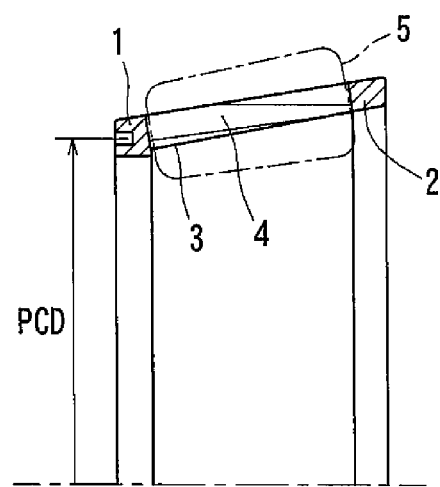

As shown in FIGS. 2(*a*) and 2(*b*), groove-shaped thinned portions 6 are intermittently arranged in the circumferential direction on the side surface of the small annular section 1. The side surface of the small annular section 1 is the surface portion of the small annular section 1 that is exposed when the small annular section 1 is seen from one side toward the other side in the axial direction or in the opposite direction. The thinned portions 6 are voids recessed in the axial direction from the periphery. The thinned portions 6 are uniformly arranged in the circumferential direction. The thinned portions 6 are identical in shape to each other when viewed from the side surface, and has an arcuate shape along the circumferential direction. Considering the cylindrical surface circumscribing each thinned portion 6 from the radial direction ("circumscribing cylindrical surface") and the cylindrical surface inscribing each thinned portions 6 from the radial direction ("inscribing cylindrical surface"), the diameter of the cylindrical surface that divides the diameter difference of the circumscribing cylindrical surface and the inscribing cylindrical surface in half is defined as a pitch circle diameter PCD (hereinafter simply referred to as "PCD") of each thinned portion 6. As used herein, a radial plane refers to a plane orthogonal to the central axis of the retainer. When the thinned portions 6 are intermittently arranged in the circumferential direction, the thinned portions 6 have substantially the same PCD.

As shown in FIGS. 2(*a*) and 2(*b*), by molding the thinned portions 6 in the small annular section 1, thicknesses of the small annular section 1 in the radial plane intersecting the thinned portions 6 are made to be substantially uniform around each thinned portion 6. For example, assuming that the shortest radial distance between the circumscribing cylindrical surface defining the PCD of each thinned portion and the outer circumferential surface of the small annular section 1 is L1, and the shortest radial distance between the inscribing cylindrical surface and the inner circumferential surface of the small annular section 1 is L2, the axial depth of the thinned portion 6 is preferably set such that the axial distance between the recessed bottom surface of the thinned portion 6 and the side surface on the axially inner side of the small annular section 1 is substantially equal to L1 and L2. Although L1=L2 is set in the embodiment shown in the drawings, PCD, L1 and L2 may be appropriately set within a range in which the effect of reducing the variation in the cooling speed when the retainer material is being cooled/hardened from the surface side of the resin retainer (die) toward the center portion of the material can be obtained, compared to when the thinned portions 6 are not provided. If the variation in the cooling speed is small, the variation in the distribution of the internal pressure of the material generated by the difference in temperatures of respective portions in the material also reduces, and consequently, formation of spaces (air gaps) in the material such as voids and air bubbles is suppressed and the problem of lowering in strength can be avoided.

The thinned portions 6 may be omitted as long as the desired molding stability can be ensured, and also may be formed in surface portions other than, as shown, the side surface on the axially outer side that does not face the pockets 4. For example, the thinned portions 6 may be formed in the axially inner side surface. Furthermore, in cases where it is preferred to obtain the effect of preventing lowering in the strength by voids or the like rather than preventing lowering in the strength involved in the thinning of the large annular section 2, the thinned portions 6 may be formed in the large annular section 2.

Discontinuing portions 7 each of which is located between the thinned portions 6, 6 adjacent to each other in the circumferential direction isolate the thinned portions 6 from each other, and are located between the inscribing cylindrical surface and the circumscribing cylindrical surface defining the PCD. The circumferential center of each of the discontinuing portions 7 is located at the site positioned on the extension passing the circumferential center of each pocket 4. This site exists on a plane Pa drawn with a chain dashed line in FIGS. 2(*b*) and 2(*c*). The plane Pa is an axial plane that equally divides the pocket 4 in half in the circumferential direction. The axial plane is a plane including the central axis of the retainer.

The resin retainer has a rotational symmetry corresponding to the number of pockets. The number of pockets is the number of the pockets 4 uniformly spaced apart from each other in the circumferential direction. Though the dimensional accuracy at each portion can be more easily obtained if the resin retainer has a rotational symmetry, the rotational symmetry is not essential.

As shown in FIGS. 1, 2(*a*), and 2(*b*), the inner circumferential surface of the small annular section 1 has a cylindrical shape. The outer circumferential surface of the small annular section 1 has a conical surface shape. The conical surface shape is continued to the outer circumferential surface of the large annular section 2 through the retainer bar sections 3. The retainer bar sections 3 and the inner circumferential surface of the large annular section 2 do not have an undercut area when seen from the other side in the axial direction.

Figure 3:
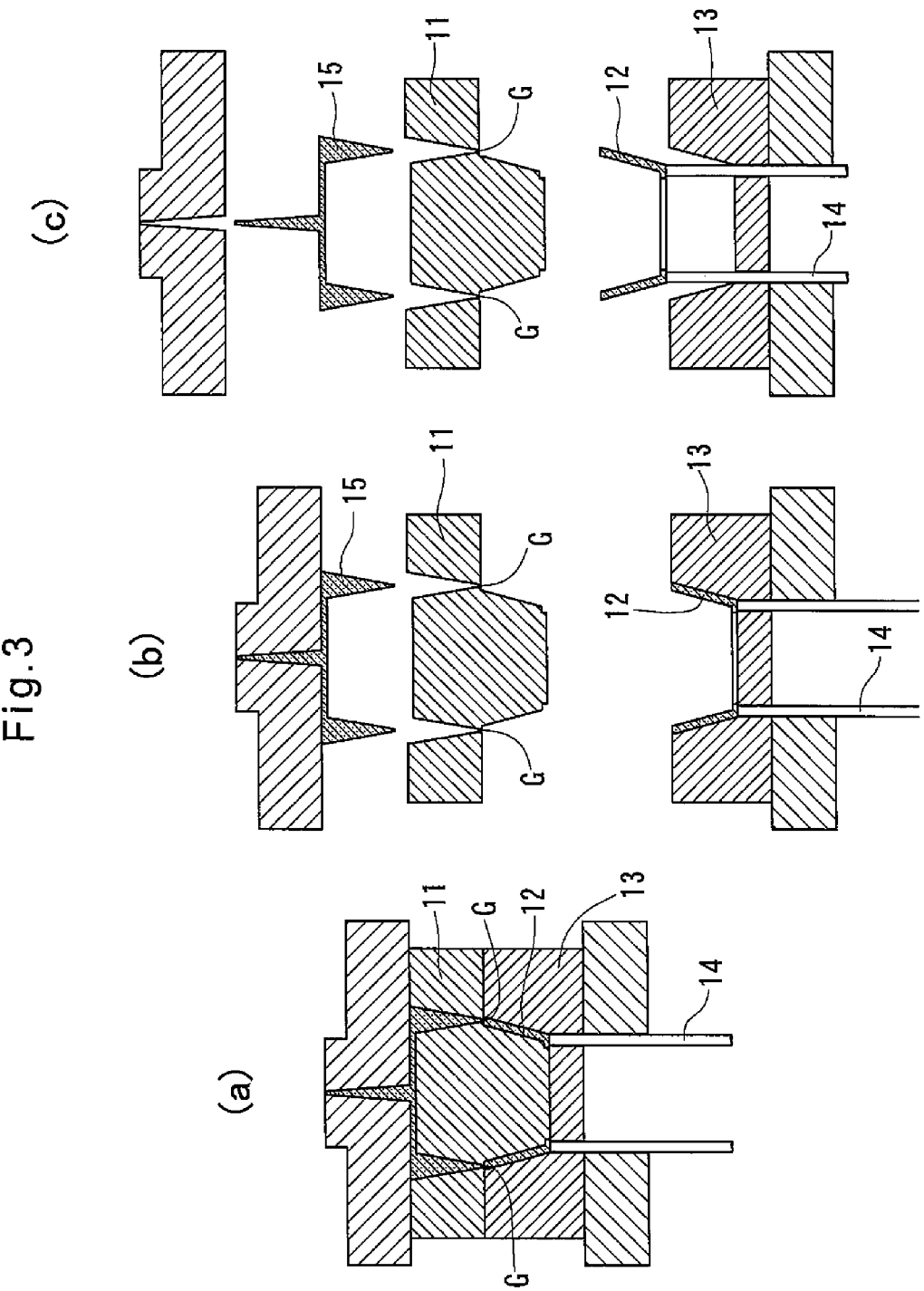
FIG. 3(a) is a schematic sectional view of a mold set for forming the retainer of the first embodiment.
FIG. 3(b) is a schematic sectional view when a movable mold and a sprue runner are separated from a fixed mold of the mold set.
FIG. 3(c) is a schematic sectional view when a molded article is released from the mold set.

As shown in FIG. 3, the resin retainer can be injection molded with a so-called three-plate mold set. Gates G which are final injection ports of the resin are provided as pinpoint gates in a fixed mold 11 of the mold set. The molded article 12 of the resin retainer can be taken out by thrusting the side surface of the small annular section with an eject pin 14, leaving the molded article 12 in a movable mold 13, as shown in FIG. 3 in a simplified manner. In the resin retainer, the positions at which the gates G are arranged correspond to the positions of gate traces broken off from sprue runners 15.

The positions of the gates G in the resin retainer are indicated with black dots in FIG. 1, where the gates G are all arranged uniformly in the circumferential direction and positioned on the planes Pa of the large annular section 2 in the large annular section 2. That is, none of the gates G is provided in any other area. The gates G are positioned at the radially middle portion of the axially outer side surface of the large annular section 2.

The total number of the gates G (number of gates) arranged in the resin retainer coincides with the number of pockets. The resin injected from each gate G flows through the path shown with one of the arrows in FIG. 1, and hence merges with the resin injected from the adjacent gate G at the large annular section 2 or the retainer bar section 3. Since the distance thereto is short, a weld line is not generated in the large annular section 2 and the retainer bar section 3. The final merging sites most distant from the injected gate G exist only in the vicinity of the planes Pa of the small annular section 1 shown in FIGS. 2(b), 2(c). In other words, as shown with the broken lines in FIG. 1 and FIGS. 2(b), 2(c), weld lines W are formed only in the vicinity of the planes Pa of the small annular section 1. Since both circumferential ends of each thinned portion 6 substantially lie along the planes Pa and L1=L2 is realized, the weld lines W are generated substantially along the planes Pa.

Since the number of the pockets of this resin retainer is an even number, the final merging sites can be limited to areas of the small annular section 1 only even if the number of the gates is set to a factor of the number of the pockets. If the number of the gates is equal to the number of the pockets, the number of the pockets may be an odd number. The number of the pockets and the number of the gates are preferably equal to each other so that each path to each of the final merging sites is the shortest to prevent the resin from cooling.

Since the weld lines are not formed in the large annular section 2 and the retainer bar sections 3 in this resin retainer, by using this resin retainer, a tapered roller bearing excelling in adaptability to high speed rotation and high vibration can be obtained.

Figure 4:
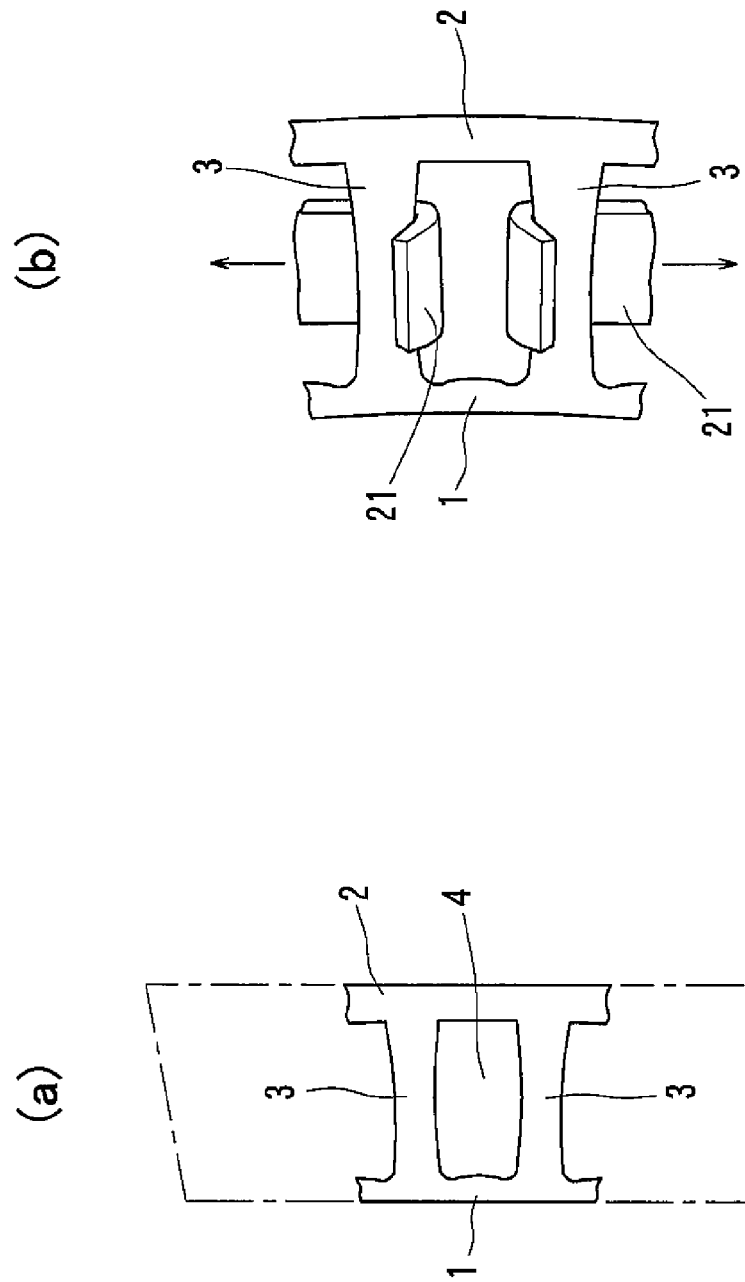
FIG. 4(a) a plan view showing a test piece of the first embodiment used for a pulling test of the weld line strength.
FIG. 4(b) is a view showing the pulling method of the test piece.
Figure 5:
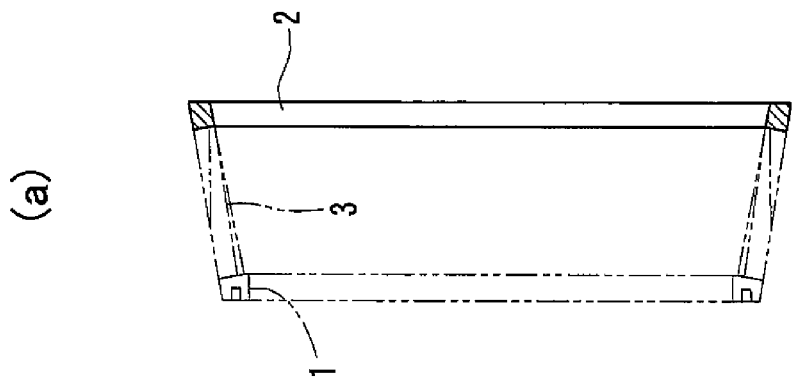
FIG. 5(a) is a plan view showing a test piece of the large annular section of the first embodiment used for a pulling test.
FIG. 5(b) is a view showing the pulling method of the test piece.
Figure 5:
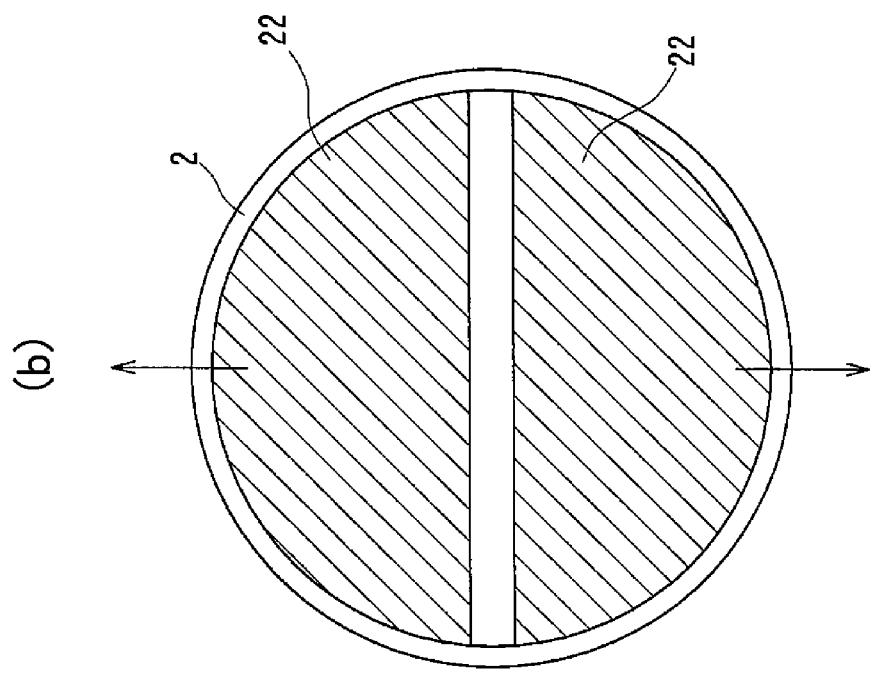

For example, the retainer may be adapted for a tapered roller bearing that supports an axle of a high speed rail vehicle. If the retainer is applied to such an application, it is required that the retainer exhibit a breaking load greater than or equal to 1600 N, as measured by a test wherein a peripheral part of one pocket 4 shown with a solid line is cut out, as shown in FIG. 4(a); two pulling clasps 21 are hooked to the central regions of the respective cut-out retainer bar sections 3, as shown in FIG. 4(b); and the pulling clasps 21, 21 are pulled in the directions of the arrows in the figure at a pulling speed of 10 mm/min. The arrows correspond to directions along the chord connecting the centers of the pair of retainer bar sections 3. As shown in FIG. 5(a), the retainer exhibits a breaking load of greater than or equal to 3300 N, as measured by a test wherein the large annular section 2 shown with a solid line is cut out; the cut-out large annular section 2 is fitted onto two split jigs 22, as shown in FIG. 5(b); and the two split jigs 22, 22 are pulled in the directions of the arrows in the figure at a pulling speed of 10 min/min. The arrows correspond to the direction of gravity and along an axial plane.

As shown in FIG. 1 and FIGS. 2(b), 2(c), each of the weld lines W traverses the small annular section 1 through the discontinuing portion 7. Therefore, when compared to the cases where each of the weld lines W traverses the area of the thinned portion 6 the sectional area of the small annular section 1 at the weld line-generating sites can be expanded and each of the weld lines W can be enlarged, while reducing the variation in the cooling speed of the resin at the thinned portion 6.

It is obviously preferable to have the discontinuing portions 7 as surfaces that define the maximum axial width of the small annular section 1 without forming recesses or holes other than those for the purpose of stabilizing the molding, in the discontinuing portion 7. Furthermore, each of the weld lines W is preferably formed to cross between the inner and outer circumferential surfaces of the small annular section 1 passing only the axial plane including the discontinuing portion 7, so that the weld line W is enlarged utilizing the sectional area to the fullest. To enlarge the sectional area at the weld line-generating sites, L2 may be made to be larger than L1.

Figure 6:
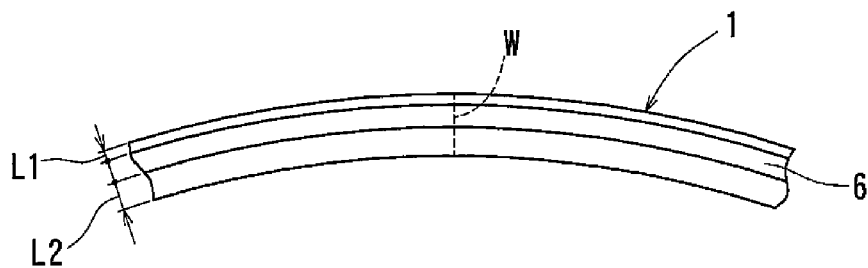
FIG. 6 is a partial side view of a second embodiment of the present invention.

A second embodiment will be described referring to FIG. 6. Hereinafter, description will be made only of what differs from the first embodiment. As illustrated in FIG. 6, in the second embodiment, a single thinned portion 6 is provided to extend over the entire circumference to further enhance the molding stability. The thinned portion 6 has a circular shape in side view. The cylindrical inner circumferential surface of the small annular section 1 of this embodiment has a smaller diameter than that of the first embodiment in order to increase the sectional area of the small annular section 1 at the weld line-generating sites. As a consequence, L2 is larger than L1, and the radial width of the small annular section 1 at the weld line-generating sites is radially inwardly expanded. As a result, the sectional area of the small annular section 1 is expanded to a degree greater than or equal to the increased amount of the sectional area of the thinned portion 6 at the weld line-generating sites. Therefore, in the second embodiment, the weld line strength of greater than or equal to the strength in the first embodiment can be ensured even though the weld lines W pass through the thinned portion 6.

Figure 7:
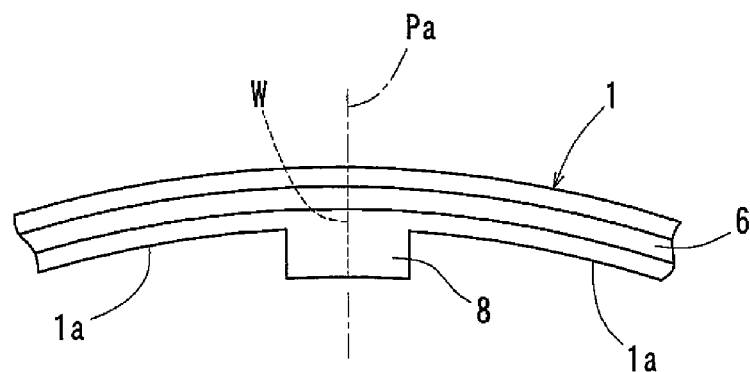
FIG. 7 is a partial side view of a third embodiment of the present invention.

A third embodiment will be described referring to FIG. 7. The small annular section 1 of the third embodiment includes projections 8 having inside diameter dimensions smaller than the maximum inside diameter of the small annular section 1, which is the inside diameter of maximum inside diameter portions 1a that are intermittently arranged in the circumferential direction. Each of the maximum inside diameter portions 1a has an arcuate shape in side view, and is set to have an inside diameter corresponding to that of the cylindrical inner circumferential surface of the small annular section of the first embodiment. The circumferential center of each of the projections 8 is positioned on the plane Pa. Each of the weld lines W traverses the small annular section 1 through the projection 8. Therefore, compared to the second embodiment, in which the inside diameter is reduced in the entire inner circumferential surface of the small annular section 1, the resin can be saved while ensuring the weld line strength with the projections 8 in the third embodiment. The shape of the projections 8 in side view may appropriately be selected, and for example, a central recessed shape having a smaller curvature than the maximum inside diameter portions 1a, or a flat shape lying along the chord direction may be adopted.

Figure 8:
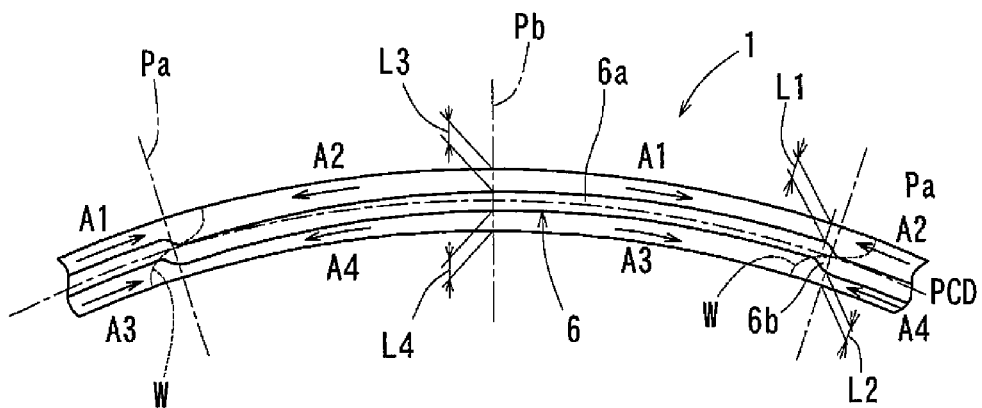
FIG. 8 is a partial side view of a fourth embodiment of the present invention.

A fourth embodiment will be described referring to FIG. 8. The thinned portion 6 of the fourth embodiment has a wave shape in side view, and is arranged over the entire circumference. A saw-tooth wave shape advancing in one of the opposite circumferential directions is adopted for the wave shape. The PCD is set at the middle of the amplitude of the thinned portion 6. The circumferential center of each rising portion 6a that gradually approaches the outer circumferential surface of the small annular section 1 with advancement in the one of the opposite circumferential directions is set on a plane Pb. The plane Pb is the axial plane passing through the circumferential center of the corresponding retainer bar section 3. The plane Pa is set at the circumferential center of each falling portion 6b that suddenly approaches the inner circumferential surface of the small annular section 1 from the rising portion Ga. The inner and outer groove walls of the thinned portion 6 have the above-described wave shape on any radial plane, and the groove width is substantially constant over the entire length thereof. On each plane Pb, L3 is set to be equal to L4, where L3 is the radial distance between the outer circumferential surfaces of the thinned portion 6 and of the small annular section 1, and L4 is the radial distance between the inner circumferential surfaces of the thinned portion 6 and of the small annular section 1. L1 is set between the terminal end of the outer groove wall of each rising portion 6a and the outer circumferential surface of the small annular section 1. L2 is set between the starting end of the inner groove wall of each rising portion 6a and the inner circumferential surface of the small annular section 1. Therefore, L3>L1 and L4>L2 are realized.

After reaching the vicinity of each plane Pb of the small annular section through each of the retainer bar sections, injected resin is divided to one side and the other side in the circumferential direction to flow from the plane Pb toward the planes Pa in the figure. In this case, the flow that passes the outside diameter side of the thinned portion 6 (arrows A1, A2 in the figure) and the flow that passes the inside diameter side of the thinned portion 6 (arrows A3, A4 in the figure) are generated. The paths indicated by the arrows A1 and A2 are radial spaces between the outer groove wall of the thinned portion 6 and the outer circumferential surface of the small annular section 1. The paths indicated by the arrows A3 and A4 are radial spaces between the inner groove wall of the thinned portion 6 and the inner circumferential surface of the small annular section 1. The paths indicated by the arrows A2 and A3 are wider than the paths indicated by the arrows A1 and A4, and thus require a relatively long filling time. Therefore, the flow shown by the arrow A1 on the outside diameter side of the thinned portion 6 runs past the falling portion 6b in the one of the opposite circumferential directions, while the flow shown by the arrow A4 on the inside diameter side of the thinned portion 6 runs past the falling portion 6b in the other of the opposite circumferential directions. As a result, as shown with broken lines in FIG. 8, the weld lines W are formed in a meandering form that is long in the circumferential direction when the small annular section 1 is seen from the axially outer side. Thus, in the fourth embodiment, each of the weld lines W can be enlarged and the weld line strength can be increased by the amount the meandering portion formed in each of the weld lines W using both groove walls of the thinned portion 6 while reducing the variation in the cooling speed of the resin in the thinned portion 6.

Figure 9:
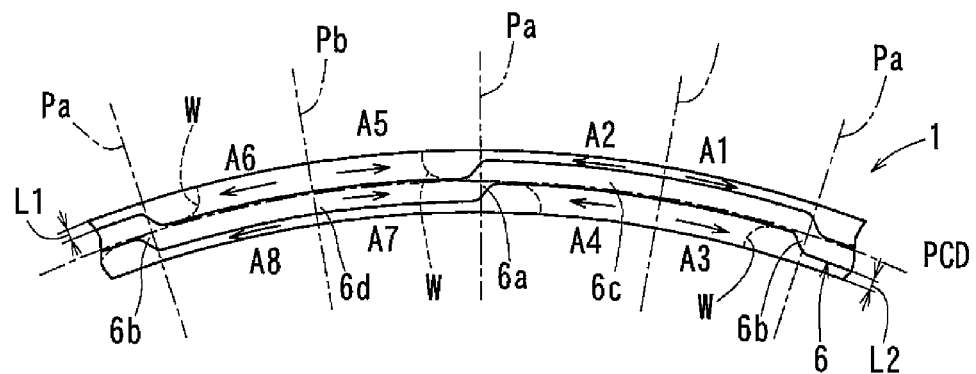
FIG. 9 is a partial side view of a fifth embodiment of the present invention.

With a wave shape other than the saw-tooth wave as well, the weld lines can be formed to a meandering form by creating a difference between the inner and outer paths with the thinned portion as the boundary. A fifth embodiment serving as one example thereof will be described referring to FIG. 9. The fifth embodiment adopts, as a wave shape, a rectangular wave shape that advances in one of the opposite circumferential directions. The PCD is set at the middle of the amplitude of the thinned portion 6. Planes Pa are set at the circumferential center of each rising portion 6a, and the circumferential center of each falling portion 6b. Planes Pb are set at the circumferential center of each outer arcuate portion 6c following one of the rising portions 6a, and the circumferential center of each inner arcuate portion 6d following one of the falling portions 6b. The groove width of the thinned portion 6 is set substantially constant over the entire length thereof. The radial distances between the outer circumferential surface of the small annular section 1 and the respective outer arcuate portions 6c are set to L1. The radial distances between the inner circumferential surface of the small annular section 1 and the respective inner arcuate portion 6d are set to L2. The paths indicated by the arrows A3 to A6 are wider than the paths indicated by the arrows A1, A2, A7 and A8, and thus require a longer filling time than the paths of the arrows A1, A2, A7, and A8. Therefore, each of the flows shown by the arrows A1, A2, A7 and A8, which are located on one and the other side of the thinned portion 6, runs past the corresponding rising portion 6a or falling portion 6b in one of the opposite circumferential directions. As a result, each of the flows shown by the arrows A3 to A6, which are respectively disposed on one and the other side of the thinned portion 6, do not reach the corresponding rising portion 6a or falling portion 6b. As a result, as shown with broken lines in FIG. 9, each of the weld lines W is formed to a meandering form that is long in the circumferential direction when the small annular section 1 is seen from the axially outer side.

Figure 10:
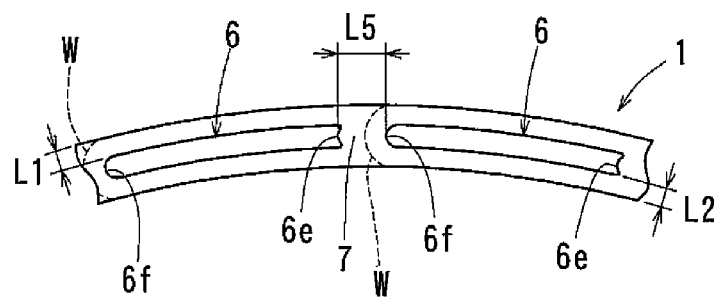
FIG. 10 is a partial side view of a sixth embodiment of the present invention.

A sixth embodiment will now be described referring to FIG. 10. In the sixth embodiment, circumferential ends 6e and 6f of each of the thinned portions 6 are changed to curved shapes in side view, instead of the flat surface shape in side view of the first embodiment. The circumferential end 6e is defined by a terminal end wall surface that disrupts the groove shape along the circumference in the other of the opposite circumferential directions, and the other circumferential end 6f is defined by a terminal end wall surface that disrupts the groove shape along the circumference in the one of the opposite circumferential directions. The circumferential ends 6e and 6f have the same curved surface shape. The minimum distance L5 in the circumferential direction between the circumferential end 6e of one of each circumferentially adjacent pair of the thinned portions 6 and the circumferential end 6f of the other of the pair is set to be greater than or equal to L2. The resin for forming the discontinuing portion 7 merges while flowing between the parallel wall surfaces in a curved form. As a result, as shown with broken lines in the figure, the weld lines W are generated along the curved shape of the circumferential ends 6e and 6f in the discontinuing portions 7 when the small annular section 1 is seen from the axially outer side. Thus, in the sixth embodiment, the weld lines W can be enlarged and the weld line strength can be increased by incorporating the curved portion into each weld line W using the circumferential ends 6e and 6f of the thinned portions 6 while reducing the variation in the cooling speed of the resin in the thinned portions 6.

Figure 11:
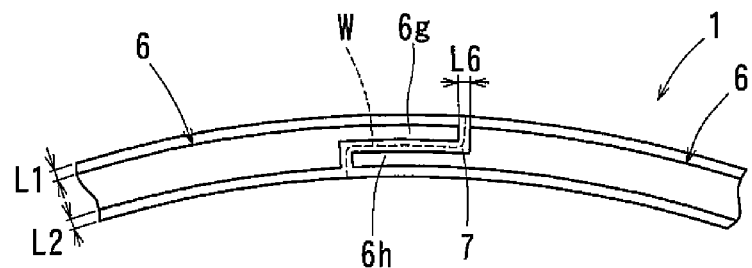
FIG. 11 is a partial side view of a seventh embodiment of the present invention.

A seventh embodiment will now be described referring to FIG. 11. The seventh embodiment differs from the first embodiment in that each of the discontinuing portions 7 has a step form in side view. One of each circumferentially adjacent pair of the thinned portions 6 includes an outer protruding portion 6g protruding in one of the opposite circumferential directions in side view, and the other of the pair of the thinned portion 6 includes an inner protruding portion 6h protruding in the other of the opposite circumferential directions in side view. The outer protruding portion 6g and the inner protruding portion 6h of the respective pair of the thinned portions 6 are parallel in the circumferential direction with a radial interval, and are spaced apart in the circumferential direction between the groove walls on the outer side and between the groove walls on the inner side, of the pair of the thinned portions 6, 6. In other words, each of the discontinuing portions 7 is formed to a step form in side view by being bent toward the outer circumferential surface of the small annular section 1 at one end in the circumferential direction, and being bent toward the inner circumferential surface of the small annular section 1 at the other end in the circumferential direction. The discontinuing portion 7 has a groove width L6 which is substantially uniform over the entire length of the discontinuing portion 7, and is set to be substantially equal to L2. The resin for forming the discontinuing portion 7 merges while flowing between the parallel wall surfaces in the step form. As a result, as shown with a broken line in FIG. 11, each of the weld lines W that lies along the step form of the discontinuing portion 7 is generated when the small annular section 1 is seen from the axially outer side. Thus, in the seventh embodiment, each of the weld lines W can be enlarged and the weld line strength can be increased by the amount the step form portion is formed in each of the weld lines W while reducing the variation in the cooling speed of the resin in the thinned portion 6. In a specific arrangement, thinned portions 6 each having the outer protruding portion 6g at one circumferential end thereof and the inner protruding portion 6h at the other circumferential end, may be arranged in the circumferential direction. Alternatively, thinned portions 6 each having the outer protruding portions 6g at the respective circumferential ends and thinned portion 6 each having the inner protruding portions 6h at the respective circumferential ends may be alternately arranged in the circumferential direction.

Figure 12:
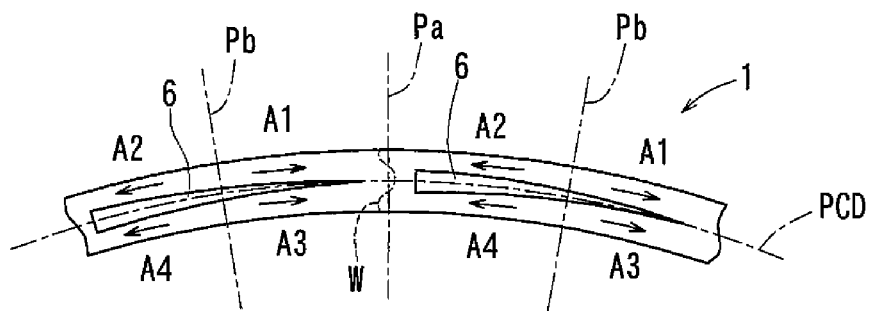
FIG. 12 is a partial side view of an eighth embodiment of the present invention.

An eighth embodiment will now be described referring to FIG. 12. The eighth embodiment differs from the first embodiment in that the thinned portions 6 are formed to a wedge shape tapered with advancement in one of the opposite circumferential directions in side view. The inner and outer groove walls of each of the thinned portions 6 approach each other by an equal distance in the radial direction with advancement in the one of the opposite circumferential directions. Thus, the wedge shaped distal ends of the thinned portions 6 are positioned on the PCD. Assuming the minimum distance in the circumferential direction between each circumferentially adjacent pair of the thinned portions 6 as L7, the planes Pa are set at the circumferential centers of the respective distances L7. The planes Ph are set at the circumferential centers of the respective thinned portions 6. L7 is set to be greater than or equal to L2. The paths indicated by the arrows A1 and A3 are wider than the paths indicated by the arrows A2 and A43, and thus require a longer filling time than the paths of the arrows A2 and A4. Therefore, the flows shown by the arrows A2 and A4 run past the plane Pa in the other of the opposite circumferential directions. As a result, as shown with a broken line in FIG. 12, each of the weld lines W curved at the discontinuing portion 7 is generated when the small annular section 1 is seen from the axially outer side. Thus, each of the weld lines W can be enlarged and the weld line strength can be increased by incorporating the curved portion into each weld line W while reducing the variation in the cooling speed of the resin in the thinned portion 6.

Figure 13:
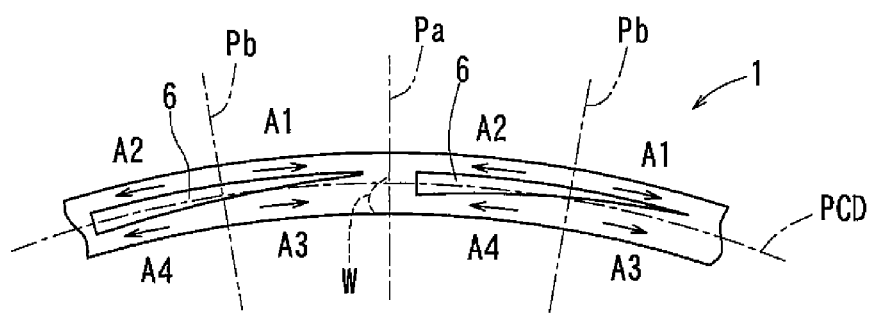
FIG. 13 is a partial side view of a ninth embodiment of the present invention.

The weld lines curved at the discontinuing portions can be obtained with other wedge shapes. A ninth embodiment serving as one example thereof will be described referring to FIG. 13. The ninth embodiment differs from the first embodiment in that only the groove wall on the inner side of each thinned portion 6 gradually approaches the groove wall on the outer side with advancement in one of the opposite circumferential directions. The wedge shaped distal end of each of the thinned portions 6 is positioned on the distal end of the groove wall on the outer side, which is closer to the outer circumferential surface of the small annular section 1 than is the PCD. The positions of the planes Pa and Pb are respectively the same as in the eighth embodiment. Since the groove wall on the outer side of each thinned portion 6 has an arcuate shape along the PCD, there is no difference between the path indicated by the arrow A1 and the path indicated by the arrow A2. In particular, since the differences in width between the path of the arrow A1 and the path of the arrow A3 and between the path of the arrow A3 and the path of the arrow A4 are greater than in the eighth embodiment, the flow of the arrow A4 runs out greatly in the other of the opposite circumferential directions. As a result, as shown with a broken line in FIG. 13, each weld line W includes the curved portion at a position of the discontinuing portion 7 closer to the inner circumferential surface of the small annular section 1 than is the PCD when the small annular section 1 is seen from the axially outer side.

Figure 14:
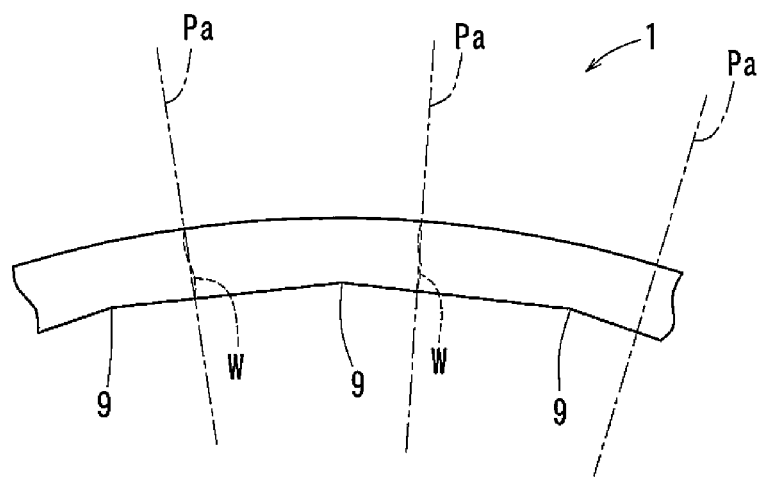
FIG. 14 is a partial side view of a tenth embodiment of the present invention.

A tenth embodiment will now be described referring to FIG. 14. The tenth embodiment differs from the first embodiment in that the inner circumferential surface of the small annular section 1 is a polygonal shape in side view. The illustration of the thinned portions is omitted. The number of vertices 9 of the polygonal shape, that is, the number of corners of the polygonal shape coincides with the number of the pockets. The diameter of the circle circumscribing the vertices 9 constitutes the maximum inside diameter of the small annular section 1, and corresponds to the inside diameter of the cylindrical inner circumferential surface of the small annular section in the first embodiment. The plane Pa passing through the circumferential center of each pocket is shifted in the circumferential direction from the corresponding vertex 9 of the polygonal shape. As a result, at each weld line forming area, the sectional area of the small annular section 1 is enlarged radially inwardly by the amount corresponding to the difference between the side of the polygonal shape and the circumference passing through the vertices 9. Therefore, in the tenth embodiment, each of the weld lines W can be enlarged and the weld line strength can be increased than in the first embodiment.

Figure 15:
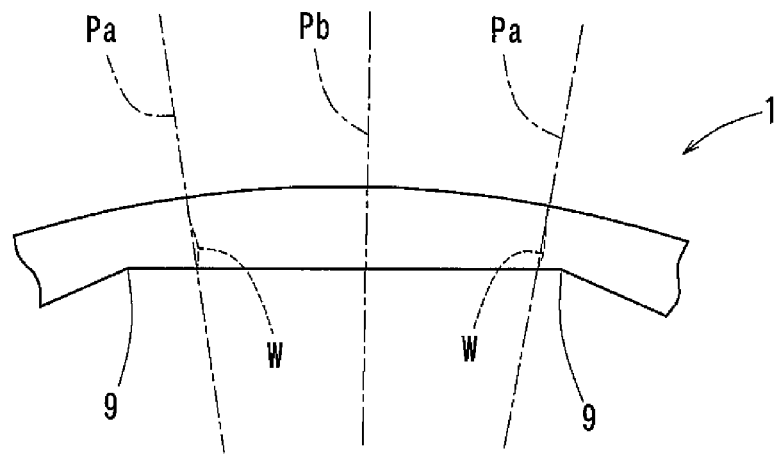
FIG. 15 is a partial side view of an eleventh embodiment of the present invention.

The number of the pockets and the number of the vertices 9 may be different from each other. An eleventh embodiment is shown in FIG. 15 as an example in which the respective numbers are different. In the eleventh embodiment, the number of corners of the polygonal shape is reduced and each side is made longer than in the tenth embodiment, so that the number of the pockets is less than the number of the vertices 9. In this case, the difference between each side of the polygonal shape and the circumference passing through the vertices 9 can be further increased.

A twelfth embodiment will now be described referring to FIG. 16. The twelfth embodiment is a variant of the third embodiment. The illustration of the thinned portion is omitted. The twelfth embodiment differs from the third embodiment in that the circumferential center of each of the projections 8 and the plane Pa passing through the circumferential center of the corresponding pocket are shifted in the circumferential direction from each other. When the circumferential center of the projection 8 is shifted in the circumferential direction with respect to the plane Pa, a relatively long time is required to fill the resin in the wider one of the portions of the projection 8 on both sides of the plane Pa, whereby the weld line bends in the projection 8. Therefore, in the twelfth embodiment, each of the weld lines W can be enlarged and the weld line strength can be increased than the third embodiment.

Figure 16:
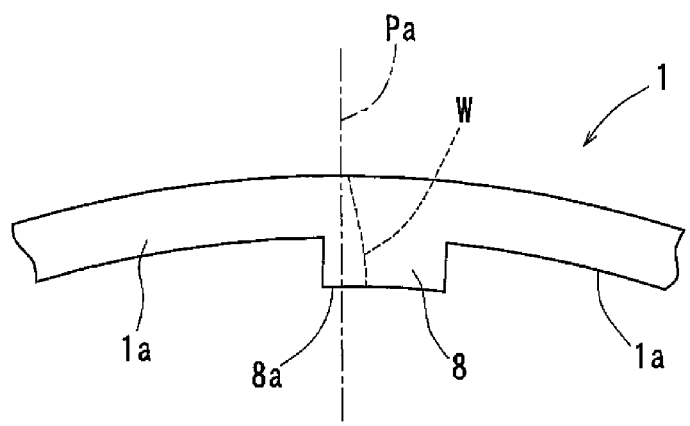
FIG. 16 is a partial side view of a twelfth embodiment of the present invention.
Figure 17:
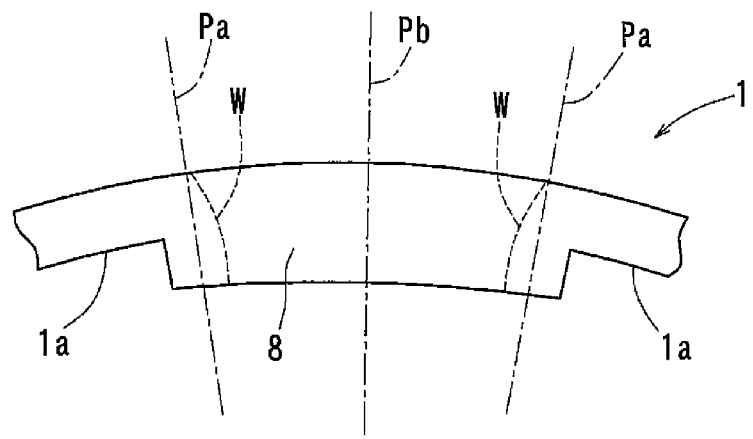
FIG. 17 is a partial side view of a thirteenth embodiment of the present invention.

The number of the pockets and the number of the projections 8 may be equal to each other as in the embodiment of FIG. 16 or may be different. A thirteenth embodiment is shown in FIG. 17 as an example when the respective numbers are different. In the thirteenth embodiment, each of the projections 8 is formed to intersect a plurality of planes Pa. In this case, the strength of the small annular section 1 can be increased by the amount the projection 8 is greater than the twelfth embodiment. Furthermore, since the number of the planes Pa that intersect the projection 8 is two, paths of resin branched from the vicinity of a single plane Pb disposed between the two planes Pa and directed to the respective planes Pa are further larger than the paths with which the former paths merge, so that the weld lines W can be easily bent greatly. The technical scope of the invention is not limited to each of the embodiments described above, and encompasses all modifications that fall within the scope of the technical concept based on the description of the accompanying Claims.

1 small annular section
1a maximum inside diameter portion
2 large annular section
3 retainer bar section
4 pocket
5 tapered roller
6 thinned portion 6e, 6f circumferential end
7 discontinuing portion
8 projection
9 vertex
Pa plane
G gate
W weld line

The invention claimed is:

1. A retainer for a tapered roller bearing comprising a small annular section, a large annular section, and retainer bar sections, wherein the small annular section, the large annular section and all of the retainer bar sections are integrally injection molded;
wherein gates are arranged at sites of the large annular section uniformly spaced apart from each other in a circumferential direction and positioned on extensions of circumferential center lines of respective pockets;
wherein weld lines are generated only in the small annular section;
wherein the small annular section includes projections with which an inside diameter dimension is circumferentially intermittently reduced from a maximum inside diameter portion of the small annular section; and
wherein the weld lines traverse the small annular section through the respective projections.

2. The retainer for a tapered roller bearing according to claim 1, wherein thinned portions are formed on a side surface of the small annular section so as to extend over an entire circumference of the small annular section.

3. The retainer for a tapered roller bearing according to claim 2, wherein each of the thinned portions has a groove defined therein.

4. The retainer for a tapered roller bearing according to claim 1, wherein thinned portions are formed on a side surface of the small annular section so as to be intermittently arranged in the circumferential direction; and
wherein each of the weld lines extends across an inner circumferential surface of the small annular section and an outer circumferential surface of the small annular section through a discontinuing portion provided between each circumferentially adjacent pair of the thinned portions.

5. The retainer for a tapered roller bearing according to claim 4, wherein each of the thinned portions has a groove defined therein.

6. The retainer for a tapered roller bearing according to claim 1, wherein an inner circumferential surface of the small annular section has a polygonal shape in side view, each of vertices of the polygonal shape and a circumferential center of each of the pockets being shifted in the circumferential direction.

7. The retainer for a tapered roller bearing according to claim 1, wherein a circumferential center of each of the projections and a circumferential center of each of the pockets are shifted in the circumferential direction.

8. A tapered roller bearing in which the retainer for a tapered roller bearing according to claim 1 is incorporated.

9. The retainer for a tapered roller bearing according to claim 1, wherein the retainer is a resin retainer.

10. A retainer for a tapered roller bearing comprising a small annular section, a large annular section, and retainer bar sections, wherein the small annular section, the large annular section and all of the retainer bar sections are integrally injection molded;
wherein gates are arranged at sites of the large annular section uniformly spaced apart from each other in a circumferential direction and positioned on extensions of circumferential center lines of respective pockets;
wherein weld lines are generated only in the small annular section;
wherein thinned portions are intermittently lined in the circumferential direction on the side surface a side surface of the small annular section;
wherein discontinuing portions are respectively provided between the thinned portions adjacent to each other in the circumferential direction, each of the discontinuing portions having a step form in side view; and
wherein the weld lines are respectively formed along the step forms.

11. The retainer for a tapered roller bearing according to claim 10, wherein each of the thinned portions has a groove defined therein.

12. A tapered roller bearing in which the retainer for a tapered roller bearing according to claim 10 is incorporated.

13. The retainer for a tapered roller bearing according to claim 10, wherein the retainer is a resin retainer.

* * * * *